United States Patent
Aragaki et al.

(10) Patent No.: US 8,335,376 B2
(45) Date of Patent: Dec. 18, 2012

(54) IMAGE PROCESSING APPARATUS, IMAGE PROCESSING METHOD, AND COMPUTER-READABLE STORAGE MEDIUM STORING IMAGE PROCESSING PROGRAM

(75) Inventors: Hideya Aragaki, Hino (JP); Takahiro Saito, Yokohama (JP); Takashi Komatsu, Yokohama (JP)

(73) Assignees: Olympus Corporation, Tokyo (JP); Kanagawa University, Yokohama-Shi (JP)

(*) Notice: Subject to any disclaimer, the term of this patent is extended or adjusted under 35 U.S.C. 154(b) by 928 days.

(21) Appl. No.: 12/396,638

(22) Filed: Mar. 3, 2009

(65) Prior Publication Data
US 2009/0226087 A1 Sep. 10, 2009

(30) Foreign Application Priority Data
Mar. 4, 2008 (JP) ................... 2008-53378

(51) Int. Cl.
*G06K 9/00* (2006.01)
(52) U.S. Cl. ............... 382/167; 382/162; 382/166
(58) Field of Classification Search .......... 382/162–167, 382/254–275
See application file for complete search history.

(56) References Cited

U.S. PATENT DOCUMENTS

| | | | | |
|---|---|---|---|---|
| 5,787,203 A * | 7/1998 | Lee et al. | ............... | 382/232 |
| 5,799,113 A * | 8/1998 | Lee | ............... | 382/256 |
| 6,069,982 A * | 5/2000 | Reuman | ............... | 382/275 |
| 6,798,901 B1 * | 9/2004 | Acharya et al. | ............... | 382/166 |
| 6,801,672 B1 * | 10/2004 | Thomas | ............... | 382/275 |
| 7,260,266 B2 * | 8/2007 | Nakajima et al. | ............... | 382/240 |
| 7,630,573 B2 * | 12/2009 | Hayashi et al. | ............... | 382/261 |
| 7,945,111 B2 * | 5/2011 | Ishiga | ............... | 382/263 |
| 2008/0199100 A1 * | 8/2008 | Ishiga | ............... | 382/263 |
| 2009/0040386 A1 * | 2/2009 | Ishiga | ............... | 348/607 |
| 2010/0246949 A1 * | 9/2010 | Chien et al. | ............... | 382/167 |

FOREIGN PATENT DOCUMENTS
JP 09-212623 A 8/1997

OTHER PUBLICATIONS
Chang et al "Effective Use of spatial and spectral correlation for color filter array demosaicking" Consumer Electronics, IEEE Transactions on 2004.*

\* cited by examiner

*Primary Examiner* — Wesley Tucker
*Assistant Examiner* — Sean Motsinger
(74) *Attorney, Agent, or Firm* — Holtz, Holtz, Goodman & Chick, PC (57) ABSTRACT

An image processing apparatus that corrects an image signal constituted by a plurality of color signals, includes a separation unit that separates the image signal into two or more subband signals; a selection unit that selects a correction processing subject color signal from the plurality of color signals; an S/N estimation unit that estimates an S/N ratio in relation to the subband signal of the color signal selected by the selection unit; a coefficient setting unit that sets a coefficient on the basis of the S/N ratio; and a correction unit that performs correction processing on the subband signal of the selected color signal by adding the subband signal of the correction processing subject color signal to the subband signal of another color signal not subject to the correction processing on the basis of the coefficient.

13 Claims, 5 Drawing Sheets

IMAGE PROCESSING APPARATUS, IMAGE PROCESSING METHOD, AND COMPUTER-READABLE STORAGE MEDIUM STORING IMAGE PROCESSING PROGRAM

TECHNICAL FIELD OF THE INVENTION

This invention relates to image processing, and more particularly to image processing for correcting a noise artifact and so on in an image.

BACKGROUND OF THE INVENTION

In an image processing apparatus for removing a noise signal from an image signal, a noise removal method employing multiresolution decomposition is widely known. In multiresolution decomposition, an image signal is divided into a plurality of frequency subband signals using a filter bank method or a Laplacian pyramid method such that during noise removal, noise removal processing can be performed on each of the divided bands with an appropriate intensity.

JP9-212623A discloses noise reduction processing employing wavelet transform as a multiresolution decomposition method. Here, wavelet transform is implemented on original image data to obtain a plurality of frequency subband components, whereupon noise reduction processing is implemented by performing coring processing on each subband component. Following the coring processing, the subband components are resynthesized through inverse wavelet transform, whereby noise reduction-processed image data are obtained.

SUMMARY OF THE INVENTION

In the method described in JP9-212623A, when an absolute value of a signal value is equal to or smaller than a predetermined threshold, the value is forcibly set at 0 by coring of the subband components. Further, this method relates to a luminance signal of a radiological image or the like, and when it is applied to a color signal, the processing is performed individually on each color signal. Therefore, correlativity among the color signals is not taken into account, and when the correlation breaks down due to the coring, unnatural artifacts such as false color are likely to occur on the edge portions.

According to an aspect of this invention, an image processing apparatus that corrects an image signal constituted by a plurality of color signals is provided. The image processing apparatus comprises a separation unit that separates the image signal into two or more subband signals; a selection unit that selects a correction processing subject color signal from the plurality of color signals; an S/N estimation unit that estimates an S/N ratio in relation to the subband signal of the color signal selected by the selection unit; a coefficient setting unit that sets a coefficient on the basis of the S/N ratio; and a correction unit that performs correction processing on the subband signal of the selected color signal by adding the subband signal of the correction processing subject color signal to the subband signal of another color signal not subject to the correction processing on the basis of the coefficient.

According to another aspect of this invention, a computer-readable storage medium storing an image processing program for causing a computer to execute image processing to correct an image signal constituted by a plurality of color signals is provided. The program comprises: a separation step for separating the image signal into two or more subband signals; a selection step for selecting a correction processing subject color signal from the plurality of color signals; an S/N estimation step for estimating an S/N ratio in relation to the subband signal of the color signal selected in the selection step; a coefficient setting step for setting a coefficient on the basis of the S/N ratio; and a correction step for performing correction processing on the subband signal of the selected color signal by adding the subband signal of the correction processing subject color signal to the subband signal of another color signal not subject to the correction processing on the basis of the coefficient.

According to yet another aspect of this invention, an image processing method for correcting an image signal constituted by a plurality of color signals is provided. The method comprises separating the image signal into two or more subband signals; selecting a correction processing subject color signal from the plurality of color signals; estimating an S/N ratio in relation to the subband signal of the color signal selected by the selecting; setting a coefficient on the basis of the S/N ratio; and performing correction processing on the subband signal of the selected color signal by adding the subband signal of the correction processing subject color signal to the subband signal of another color signal not subject to the correction processing on the basis of the coefficient.

Embodiments and advantages of this invention will be described in detail below with reference to the attached figures.

DESCRIPTION OF THE PREFERRED EMBODIMENTS

Figure 1:
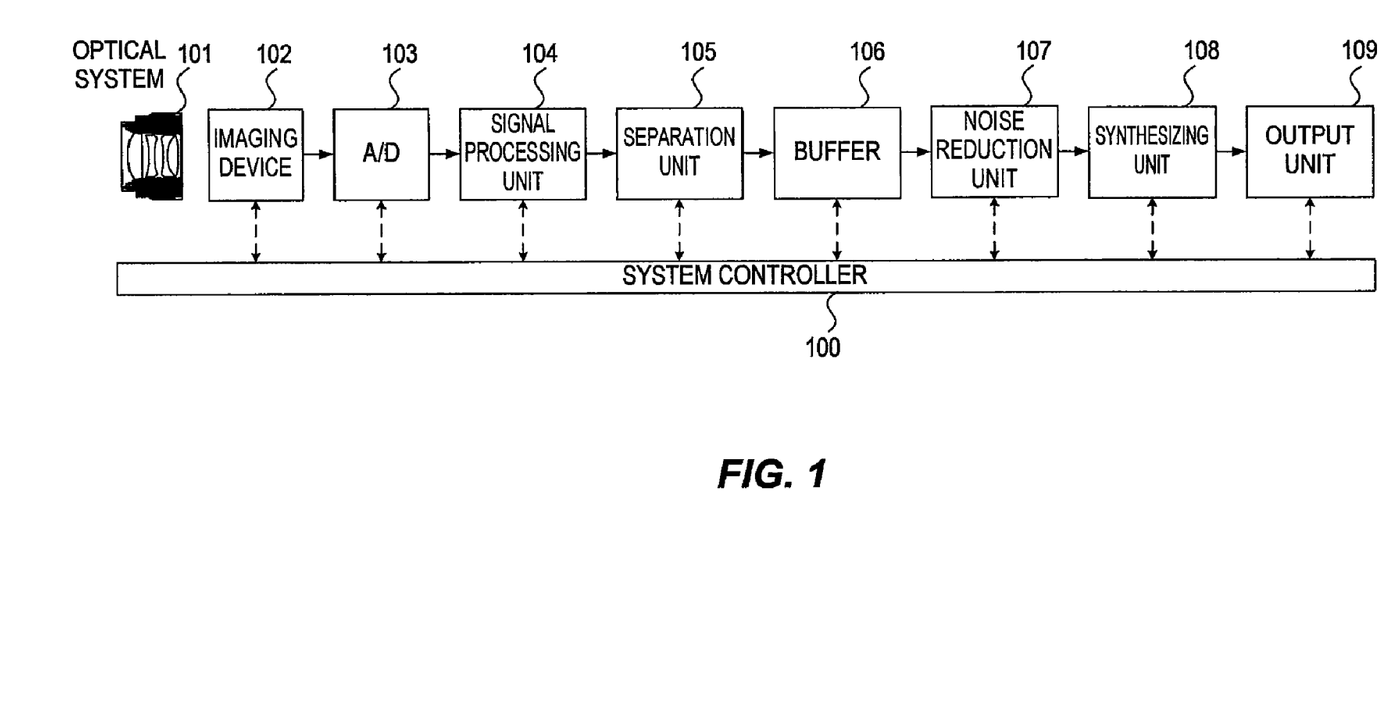
FIG. 1 is a system constitution diagram showing an imaging apparatus according to an embodiment of this invention.

FIG. 1 is a system constitution diagram showing an imaging apparatus according to an embodiment of this invention. The imaging apparatus is constituted by an optical system 101, an imaging device 102, an A/D conversion unit (A/D hereafter) 103, a signal processing unit 104, a separation unit 105, a buffer 106, a noise reduction unit 107, a synthesizing unit 108, an output unit 109, and a system controller 100.

The imaging device 102 is connected to the signal processing unit 104 via the A/D 103. The signal processing unit 104 is connected to the separation unit 105. The separation unit 105 is connected to the buffer 106. The buffer 106 is connected to the noise reduction unit 107. The noise reduction unit 107 is connected to the output unit 109 via the synthesizing unit 108.

The respective processing units are connected bidirectionally to the system controller 100, and operations thereof are controlled by the system controller 100. Solid lines indicate data signal lines, and broken lines indicate control signal lines.

On the basis of the control performed by the system controller 100, the imaging device 102 outputs an optical image, which is formed on a surface of the imaging device 102 via the optical system 101, as an analog image signal. The analog image signal is transferred to the A/D 103. In this embodiment, the imaging device 102 is a color imaging device in which a color filter array is disposed on a front surface thereof, but the imaging device 102 may employ a single plate system (for example, single CCD) or a multi-plate system (for example, two or three CCD).

The A/D 103 converts the analog image signal into a digital signal and transfers the converted digital signal to the signal processing unit 104. The signal processing unit 104 implements predetermined signal processing on the digital signal to generate a color three-plate image signal (original image signal I hereafter) having a predetermined gradation. The original image signal I is constituted by R, G, B color signals, and these color signals will be referred to respectively as Ir, Ig, Ib hereafter. The original image signal I is transferred to the separation unit 105.

On the basis of the control performed by the system controller 100, the separation unit 105 performs multiresolution decomposition on the respective color signals Ir, Ig, Ib of the original image signal I in a predetermined number of stages n (n being an integer of no less than 1) using wavelet transform to generate high frequency components and low frequency components in a number of separation stages i (i being an integer of no less than 1 and no more than n), and records the high frequency components and low frequency components in the buffer 106. Multiresolution decomposition will be described in detail below.

On the basis of the control performed by the system controller 100, the noise reduction unit 107 reads the high frequency components and low frequency components in the number of separation stages i (i being an integer of no less than 1 and no more than n) from the buffer 106. The noise reduction processing is applied individually in each separation stage.

The noise reduction of this embodiment is executed through transform processing based on a predetermined function. Typically, processing is performed individually on each color signal, but in this embodiment, processing is performed taking color channel correlation into account. More specifically, transform processing relating to a predetermined color signal uses the other color signals such that the processing is interdependent. A detailed description of the transform processing taking color channel correlation into account has been omitted, but this processing corresponds to processing in which an energy functional constituted by a square norm of color difference and color sum defined among the color signals at each separation stage is minimized.

Processing relating to a predetermined color signal is dependent on the value of another color signal not subject to the processing, and therefore the processing is applied in parallel while successively modifying the processing subject color signal every time a single transform processing operation is completed. Furthermore, the processing is performed iteratively, i.e. repeated a predetermined number of times on each color signal.

Further, an S/N ratio of each pixel of the predetermined color signal is estimated and used as a coefficient in the transform processing. By using the S/N ratio estimated in each pixel as a coefficient, the noise reduction effect is adjusted in accordance with the noise amount.

When the iterative processing described above has been implemented in all of the separation stages, the noise reduction processing is terminated. The high frequency components and low frequency components in each stage of each noise reduction-processed color signal are then transferred to the synthesizing unit 108. The noise reduction processing will be described in detail below.

On the basis of the control performed by the system controller 100, the synthesizing unit 108 reads the low frequency components and high frequency components that have been subjected to noise reduction processing from the noise reduction unit 107 and performs multiresolution composition processing to synthesize a noise reduction-processed image signal. The multiresolution composition processing will be described in detail below.

The synthesized image signal is transferred to the output unit 109. The output unit 109 performs well-known compression processing and the like on the synthesized image signal and then records and stores the synthesized image signal on a recording medium such as a memory card.

[Separation Unit]

Figure 2:
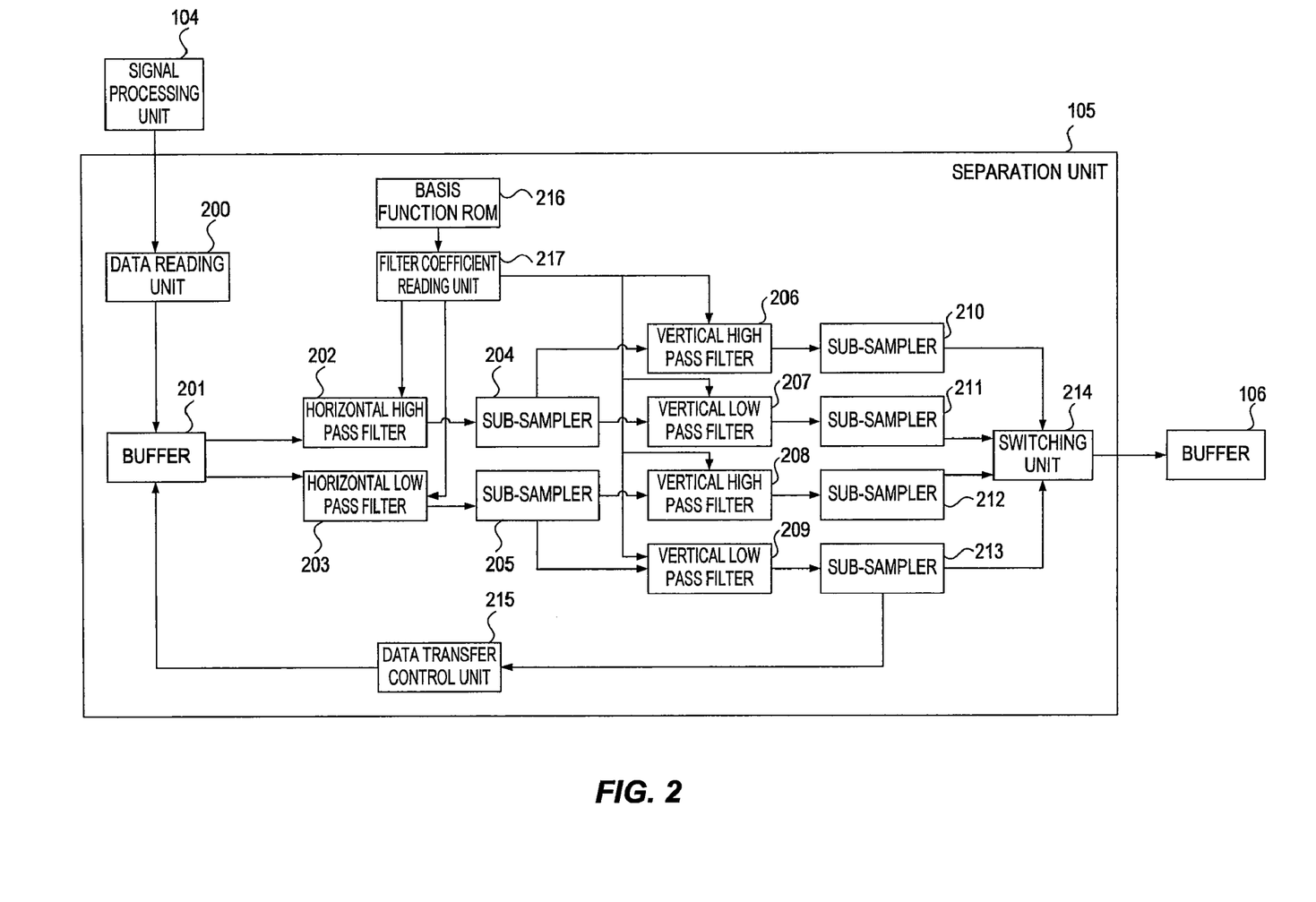
FIG. 2 is a constitutional diagram of a separation unit.

Next, referring to FIG. 2, the constitution of the separation unit 105 will be described.

The separation unit 105 includes a data reading unit 200, a buffer 201, a horizontal high pass filter 202, a horizontal low pass filter 203, sub-samplers 204, 205, a vertical high pass filter 206, a vertical low pass filter 207, a vertical high pass filter 208, a vertical low pass filter 209, sub-samplers 210 to 213, a switching unit 214, a data transfer control unit 215, a basis function ROM 216, and a filter coefficient reading unit 217.

The signal processing unit 104 is connected to the buffer 201 via the data reading unit 200. The buffer 201 is connected to the horizontal high pass filter 202 and the horizontal low pass filter 203.

The horizontal high pass filter 202 is connected to the vertical high pass filter 206 and the vertical low pass filter 207 via the sub-sampler 204. The horizontal low pass filter 203 is connected to the vertical high pass filter 208 and the vertical low pass filter 209 via the sub-sampler 205.

The vertical high pass filter 206, the vertical low pass filter 207, the vertical high pass filter 208, and the vertical low pass filter 209 are connected to the sub-sampler 210, the sub-sampler 21 1, the sub-sampler 212, and the sub-sampler 213, respectively. The sub-samplers 210 to 213 are respectively connected to the switching unit 214. The sub-sampler 213 is also connected to the data transfer control unit 215.

The switching unit 214 is connected to the buffer 106. The data transfer control unit 215 is connected to the buffer 201. The basis function ROM 216 is connected to the filter coefficient reading unit 217. The filter coefficient reading unit 217 is connected to the horizontal high pass filter 202, the horizontal low pass filter 203, the vertical high pass filter 206, the vertical low pass filter 207, the vertical high pass filter 208, and the vertical low pass filter 209.

A filter coefficient used in wavelet transform, such as a Harr function or a Daubecies function, is recorded in the basis function ROM 216. Of these functions, Equation (1) and Equation (2) respectively show a high pass filter coefficient and a low pass filter coefficient in the Harr function, for example.

$$\text{high pass filter coefficient} = \{0.5, -0.5\} \quad (1)$$

$$\text{low pass filter coefficient} = \{0.5, 0.5\} \quad (2)$$

It should be noted that these filter coefficients are used in common in a horizontal direction and a vertical direction.

The filter coefficient reading unit 217 reads the filter coefficients from the basis function ROM 216, and transfers the high pass filter coefficient to the horizontal high pass filter 202, vertical high pass filter 206, and vertical high pass filter 208, and the low pass filter coefficient to the horizontal low pass filter 203, vertical low pass filter 207, and vertical low pass filter 209.

When the filter coefficients have been transferred to the respective high pass filters and low pass filters in this manner, the data reading unit 200 reads the original image signal I from the signal processing unit 104 and transfers it to the buffer 201.

Horizontal and vertical direction filtering processing is performed on the original image signal I in the buffer 201 by the horizontal high pass filter 202, horizontal low pass filter 203, vertical high pass filter 206, vertical low pass filter 207, vertical high pass filter 208, and vertical low pass filter 209.

Here, the sub-sampler 204 and the sub-sampler 205 sub-sample an input image signal at a sub-sampling ratio of 1/2 in the horizontal direction, while the sub-samplers 210 to 213 sub-sample an input image signal at a sub-sampling ration of 1/2 in the vertical direction.

Accordingly, the output of the sub-sampler 210 provides a high frequency component HHv1 in both the horizontal and vertical directions, the output of the sub-sampler 211 provides a horizontal direction high frequency component Hh1, the output of the sub-sampler 212 provides a vertical direction high frequency component Hv1, and the output of the sub-sampler 213 provides a low frequency component L1.

The switching unit 214 transfers the three high frequency components HHv1, Hh1, Hv1 and the low frequency component L1 to the buffer 106 in succession.

Further, the data transfer control unit 215 transfers the low frequency component L1 from the sub-sampler 213 to the buffer 201.

The low frequency component L1 stored in the buffer 201 in this manner is then subjected to second stage separation through similar filtering processing to that described above, whereby three high frequency components HHv2, Hh2, Hv2 and a low frequency component L2 are output.

The process described above is controlled to be repeated until separation has been performed in the predetermined number of stages n. When the n separation stages are complete, high frequency components HHv1, Hh1, Hv1 and low frequency components L1 (i=1 to n) are stored in the buffer 106.

In this embodiment, multiresolution decomposition is performed through orthogonal wavelet transform using a Harr basis, but all wavelet bases, including a biorthogonal wavelet basis and so on, may be applied. Further, wavelet transform possessing redundancy (Stationary wavelet transform, Redundant wavelet transform, Undecimated wavelet transform, etc.), in which sub-sampling is not performed, may also be applied.

The multiresolution decomposition according to this embodiment may be replaced by Fourier transform, DCT transform, or another frequency separation method, and similar processing may be applied using a transformed transform coefficient as a subband signal.

[Noise Reduction Unit]

Figure 3:
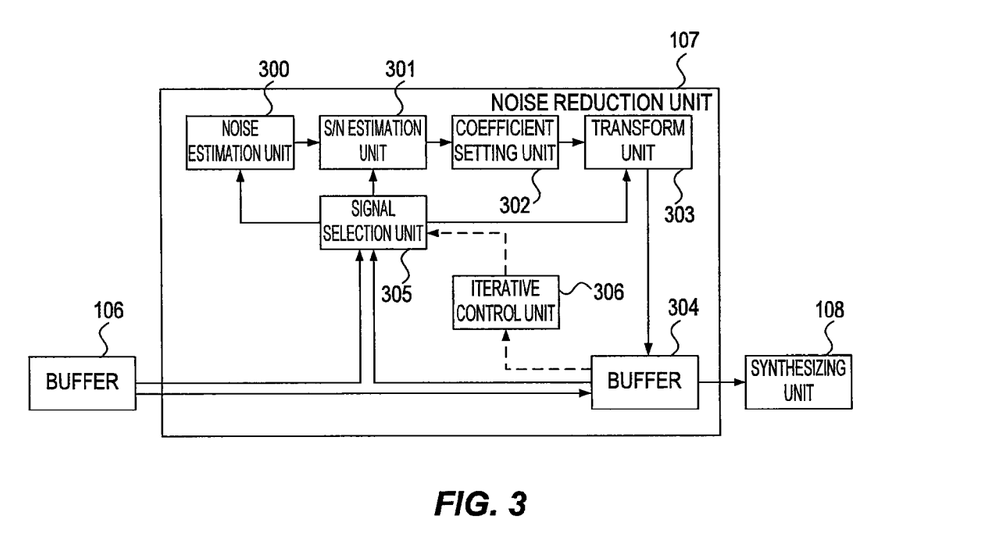
FIG. 3 is a constitutional diagram of a noise reduction unit.

Next, referring to FIG. 3, the constitution of the noise reduction unit 107 and a specific noise reduction procedure will be described.

The noise reduction unit 107 includes a noise estimation unit 300, an S/N estimation unit 301, a coefficient setting unit 302, a transform unit 303, a buffer 304, a signal selection unit 305, and an iterative control unit 306.

The buffer 106 is connected to the signal selection unit 305 and the buffer 304. The buffer 304 is connected to the signal selection unit 305, the iterative control unit 306, and the synthesizing unit 108. The iterative control unit 306 is connected to the signal selection unit 305. The signal selection unit 305 is connected to the noise estimation unit 300, the S/N estimation unit 301, and the transform unit 303. The noise estimation unit 300 is connected to the S/N estimation unit 301. The S/N estimation unit 301 is connected to the coefficient setting unit 302. The coefficient setting unit 302 is connected to the transform unit 303. The transform unit 303 is connected to the buffer 304.

As noted above, the noise reduction processing according to this embodiment is performed independently in each separation stage i (i=0 to N), and the processing subject color signal is modified every time a single transform processing operation is completed on the processing subject color signal. This processing is performed iteratively such that the transform processing is performed a predetermined number of times on each color signal.

As an example, it is assumed here that the processing sequence of the color signals is R→G→B→R→G→B ..., and a case in which the transform processing is performed on the G signal in a number of separation stages i and a number of transform processing operations j. During the description, the high frequency components relating to the respective R, G, B color signals in each separation stage i (i=0 to N) and each transform processing operation j (j=0 to J) will be denoted respectively as $R_H^{i(j)}$, $G_H^{i(j)}$, $B_H^{i(j)}$, and the low frequency components will be denoted respectively as $R_L$, $G_L$, $B_L$.

In an initial state, $R_H^{i(0)}$, $G_H^{i(0)}$, $B_H^{i(0)}$ and $R_L$, $G_L$, $B_L$ are recorded in the buffer 106 immediately after separation.

The buffer 304 overwrites $R_H^{i(j)}$, $G_H^{i(j)}$, $B_H^{i(j)}$ and $R_L$, $G_L$, $B_L$ as needed whenever the components are updated following the transform processing, but in the initial state, predetermined initialization processing is performed such that $R_H^{i(0)}$, $G_H^{i(0)}$, $B_H^{i(0)}$ and $R_L$, $G_L$, $B_L$ are obtained and recorded by the buffer 106. The initialization processing is performed only once before the transform processing begins (prior to the 0th transform processing).

Further, a flag for managing the processing subject color signal and a counter for managing the number of transform processing operations are recorded in the iterative control unit 306.

The flag is updated upon every transform processing operation to indicate the R→G→B→R→G→B ... signal, and the counter is incremented by one every time R, G, and B are subjected to one transform processing operation each.

When an instruction to set the G signal as the processing subject color signal is input into the signal selection unit 305 by a control signal from the iterative control unit 306, the signal selection unit 305 sets the G signal as the processing subject color signal, obtains $G_H^{i(0)}$ and $G_L$ from the buffer 106, and obtains $R_H^{i(j)}$ and $B_H^{i(j)}$ from the buffer 304.

The signal selection unit 305 then transfers $G_L$ to the noise estimation unit 300, $G_H^{i(0)}$ to the S/N estimation unit 301, and $R_H^{i(j)}$, $G_H^{i(0)}$, $B_H^{i(j)}$ to the transform unit 303.

In the noise estimation unit 300, a noise amount $\sigma_n$ relating to $G_H^{i(j)}$ is calculated in each pixel from a preset noise model on the basis of $G_L$. The noise model will be described in detail below. The estimated noise amount $\sigma_n$ is transferred to the S/N estimation unit 301.

In the S/N estimation unit 301, an S/N ratio relating to $G_H^{i(j)}$ is estimated. An S/N ratio $\lambda_G$ in a target pixel position is calculated on the basis of the noise amount $\sigma_n$ using Equation (3).

$$\lambda_G = \sigma_s^2 / \sigma_n^2$$

$$\sigma_s^2 = \mathrm{Max}\{0, (1/M) \cdot \Sigma (G_H^{i(0)}(p))^2 - \sigma_n\} \qquad (3)$$

Here, p represents M pixels included in a rectangular region of a predetermined size centering on the target pixel, which is extracted from $G_H^{i(0)}$, and $G_H^{i(0)}(p)$ represents a signal value in the pixels p of $G_H^{i(0)}$. In this embodiment, a 5×5 pixel region is extracted such that M=25. Max { } represents an ML (maximum likelihood) estimation, and $\sigma_s^2$ represents an effective value of $G_H^{i(0)}$ estimated in relation to the target pixel. The calculated $\lambda_G$ is transferred to the coefficient setting unit 302. It should be noted that in this embodiment, $\sigma_s^2$ is determined from an ML estimation, but this may be substituted for the square root of an average value of the values of M pixels included in a rectangular region of a predetermined size centering on the target pixel and extracted from $G_H^{i(0)}$.

In the coefficient setting unit 302, a coefficient $C_1$ relating to the processing subject G signal and a coefficient $C_2$ relating to the other color signals, i.e. the R and B signals, are calculated using Equation (4).

$$C_1 = \lambda_G/(1+2\alpha+2\beta+\lambda_G)$$

$$C_2 = (\alpha-\beta)/(1+2\alpha+2\beta+\lambda_G) \quad (4)$$

Here, $\alpha$ and $\beta$ represent coefficients for adjusting the degree of optimization (minimization of an energy functional constituted by a square norm of color difference and color sum) relating to the color difference $(R_H^{i(j)}-G_H^{i(j)})^2$, $(G_H^{i(j)}-B_H^{i(j)})^2$, $(B_H^{i(j)}-R_H^{i(j)})^2$ and the color sum $(R_H^{i(j)}+G_H^{i(j)})^2$, $(G_H^{i(j)}+B_H^{i(j)})^2$, $(B_H^{i(j)}+R_H^{i(j)})^2$, respectively. Normally, $\alpha > \beta \geq 0$ is set. The calculated coefficients $C_1$ and $C_2$ are transferred to the transform unit 303.

In the transform unit 303, $G_H^{i(j+1)}$ is calculated on the basis of a transform function defined by Equation (5).

$$G_H^{i(j+1)} = C_1 \times G_H^{i(0)} + C_2 \times R_H^{i(j)} + C_2 \times B_H^{i(j)} \quad (5)$$

The calculated $G_H^{i(j+1)}$ is transferred to the buffer 304, and overwritten onto the pre-transform processing $G_H^{i(j)}$.

When the transform result is recorded in the buffer 304, the iterative control unit 306 updates the flag indicating the processing subject color signal in accordance with the above sequence and increments the counter indicating the number of transform operations by one in relation to the G signal (in this case, G is updated to the B signal and j is updated to j+1).

The series of processes described above is then repeated while modifying the processing subject color signal in order of R, G, B.

Here, the transform processing relating to the other color signals R, B may be performed by interchanging $R_H^{i(j)}$, $G_H^{i(j)}$, $B_H^{i(j)}$ in Equations (3) to (5) derived in relation to the G signal.

Further, the iterative control unit 306 performs a check as needed to determine whether or not the counter (iteration number) has reached a predetermined number (j=J), and when the processing has been performed J times on each color signal, the transform processing relating to the separation stages i is terminated.

The processing is completed when the series of transform processes described above has been performed on all subband signals of the R, G, B signals in all stages (i=0 to N).

$R_H^{i(J)}$, $G_H^{i(J)}$, $B_H^{i(J)}$ overwritten to the buffer 304 are then transferred to the synthesizing unit 108.

Further, in the processing described above, the transform function is constituted after taking into account color difference and color sum, but when only color difference is taken into account, a transform function using the coefficients $C_1$, $C_2$ in which $\beta$ is replaced by 0 may be defined in Equations (4) and (5), and when only color sum is taken into account, a transform function using the coefficients $C_1$, $C_2$ in which $\alpha$ is replaced by 0 may be defined in Equations (4) and (5).

It should be noted that in this embodiment, the S/N ratio is estimated in each pixel, but processing may be performed with a fixed S/N ratio that is set in relation to all of the pixels.

[Noise Estimation Unit]

Figure 4:
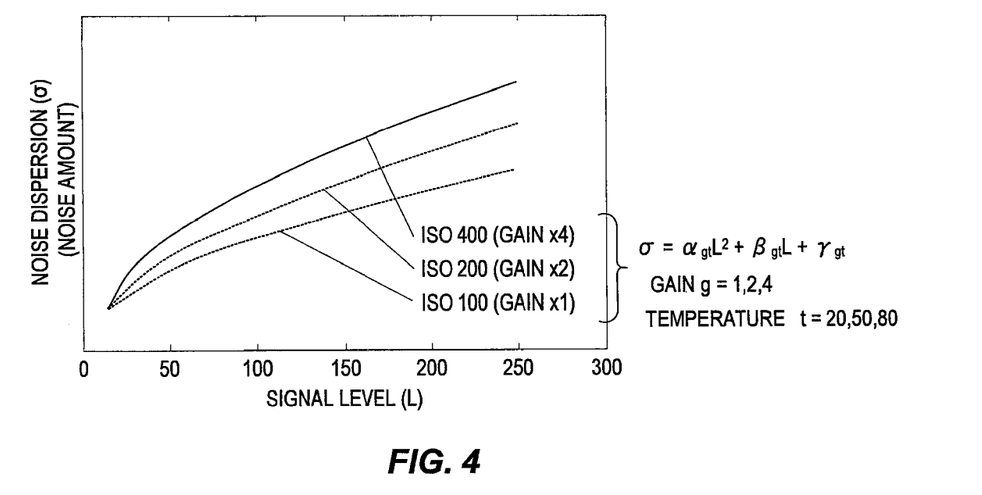
FIG. 4 is a view illustrating a noise model.

Next, referring to FIG. 4, a method of estimating the noise amount in the noise estimation unit 300 will be described.

To estimate the noise amount, a signal level-noise model (noise model hereafter) measured on the basis of actual measurement performed in advance is recorded in relation to the original image signal I, and by referring to the noise model, the noise amount $\sigma$ relative to the signal value of the original image signal I can be estimated. The noise model will be described in detail below.

The noise amount $\sigma$ increases in the manner of a quadratic curve relative to the signal level immediately after conversion by the A/D 103. As disclosed in JP2005-175718A, when a signal level-noise dispersion model is represented by a quadratic function, Equation (6) is obtained.

$$\sigma = \alpha L^2 + \beta L + \gamma \quad (6)$$

Here, $\alpha$, $\beta$ and $\gamma$ are constant items, and L represents the signal level immediately after conversion by the A/D 103. However, the noise amount $\sigma$ varies in accordance with the element temperature and gain in addition to the signal level. FIG. 4 shows an example in which noise amounts $\sigma$ are plotted at three ISO sensitivity (gain) values 100, 200, 400 relating to the gain at a certain temperature t. The individual curves take the form expressed by Equation (6), but the coefficients thereof differ according to the ISO sensitivity relating to the gain. When the gain is set as g, the temperature is set as t, and noise model formulation is performed in a manner taking the above into account, the noise amount $\sigma$ may be represented by Equation (7).

$$\sigma = \alpha_{gt} L^2 + \beta_{gt} L + \gamma_{gt} \quad (7)$$

Here, $\alpha_{gt}$, $\beta_{gt}$ and $\gamma_{gt}$ are constant items determined in accordance with the temperature t and the gain g. In the case of a color image signal, this noise model is applied independently to each color signal.

Further, a noise model such as that expressed by Equation (8) may be constructed similarly in relation to the respective high frequency components of color signals separated by multiresolution decomposition such as wavelet transform.

$$\sigma_{Hi} = \alpha_{gti} L_0^2 + \beta_{gti} L_0 + \gamma_{gti} \quad (8)$$

Here, $\sigma_{Hi}$ represents the noise amount of the high frequency component in the separation stage i, and $L_0$ represents the signal value of the low frequency component. Further, $\alpha_{gti}$, $\beta_{gti}$ and $\gamma_{gti}$ are constant items determined in accordance with the temperature t, the gain g, and the separation stage i.

It should be noted that the lowest frequency component (direct current component) of the separation stages n is preferably used as $L_0$. However, this invention is not limited thereto, and a constitution in which a low frequency component calculated by applying linear or non-linear smoothing processing to the original image, for example, is used or a constitution in which the original image is used directly may also be applied.

In the noise estimation unit 300, the noise amount for each high frequency component of each color signal is estimated by referring to the noise model described above, which is set on the basis of advance actual measurement, and then transferred to the S/N estimation unit 301.

[Synthesizing Unit]

Figure 5:
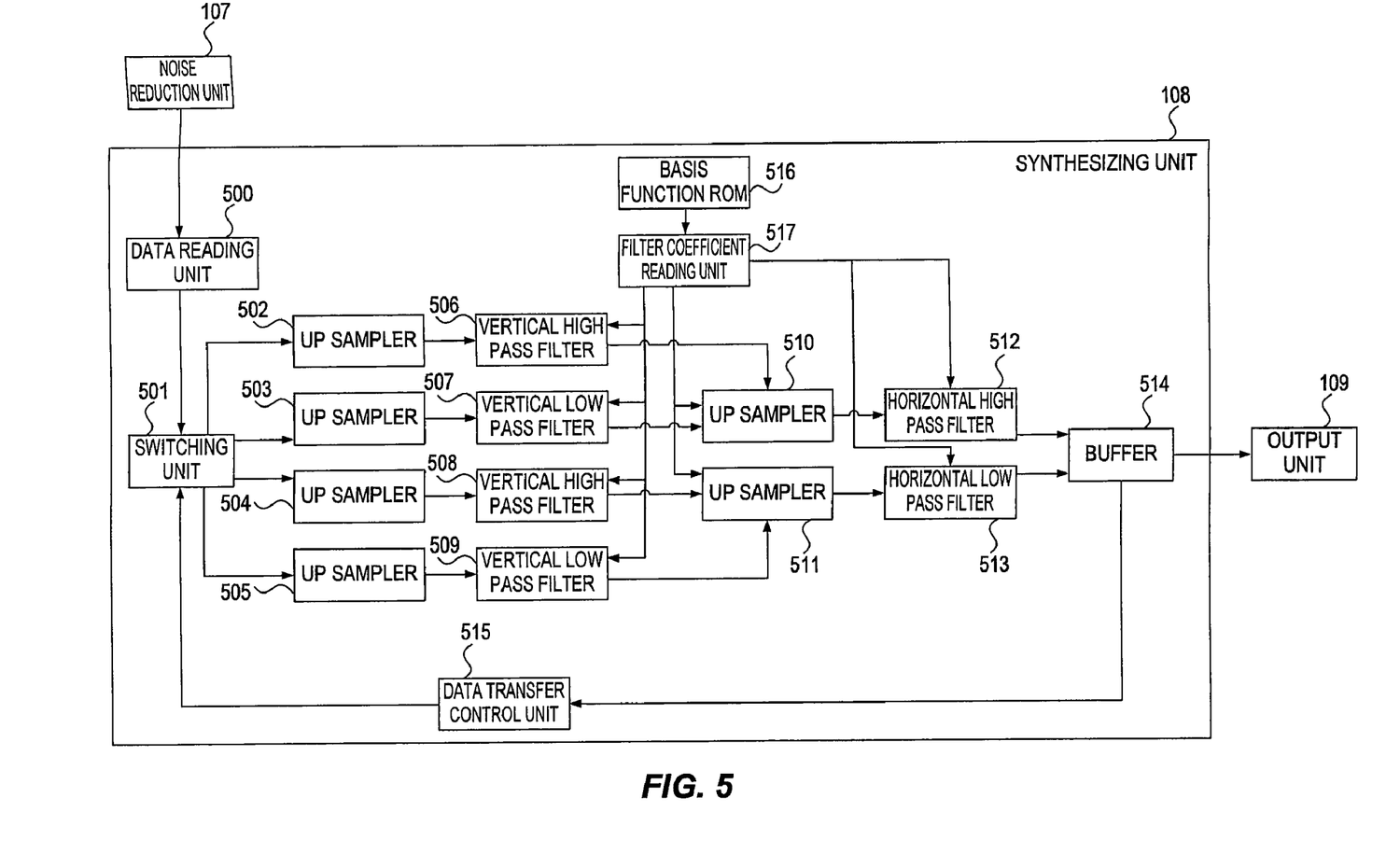
FIG. 5 is a constitutional diagram of a synthesizing unit.

Next, referring to FIG. 5, actions of the synthesizing unit 108 will be described.

The synthesizing unit 108 includes a data reading unit 500, a switching unit 501, up samplers 502 to 505, a vertical high pass filter 506, a vertical low pass filter 507, a vertical high pass filter 508, a vertical low pass filter 509, up samplers 510, 511, a horizontal high pass filter 512, a horizontal low pass filter 513, a buffer 514, a data transfer control unit 515, a basis function ROM 516, and a filter coefficient reading unit 517.

The noise reduction unit 107 is connected to the switching unit 501 via the data reading unit 500. The switching unit 501 is connected to the up samplers 502 to 505.

The up sampler 502, the up sampler 503, the up sampler 504, and the up sampler 505 are connected to the vertical high pass filter 506, the vertical low pass filter 507, the vertical high pass filter 508, and the vertical low pass filter 509, respectively.

The vertical high pass filter 506 and the vertical low pass filter 507 are connected to the up sampler 510. The vertical high pass filter 508 and the vertical low pass filter 509 are connected to the up sampler 511.

The up sampler 510 and the up sampler 511 are connected to the horizontal high pass filter 512 and the horizontal low pass filter 513, respectively. The horizontal high pass filter 512 and the horizontal low pass filter 513 are connected to the buffer 514. The buffer 514 is connected to the output unit 109 and the data transfer control unit 515.

The data transfer control unit 515 is connected to the switching unit 501. The basis function ROM 516 is connected to the filter coefficient reading unit 517. The filter coefficient reading unit 517 is connected to the vertical high pass filter 506, the vertical low pass filter 507, the vertical high pass filter 508, the vertical low pass filter 509, the horizontal high pass filter 512, and the horizontal low pass filter 513.

A filter coefficient used in inverse wavelet transform, such as a Harr function or a Daubecies function, is recorded in the basis function ROM 516.

The filter coefficient reading unit 517 reads the filter coefficients from the basis function ROM 516, and transfers the high pass filter coefficient to the vertical high pass filter 506, vertical high pass filter 508, and horizontal high pass filter 512, and the low pass filter coefficient to the vertical low pass filter 507, vertical low pass filter 509, and horizontal low pass filter 513.

After the filter coefficients have been transmitted to the respective high pass filters and the respective low pass filters in this manner, the data reading unit 500 reads the three high frequency components $HHv''n$, $Hh''n$, $Hv''n$ and the low frequency component $Ln$ that have been subjected to noise reduction processing from the buffer 304 and transfers the read frequency components to the switching unit 501.

The switching unit 501 transfers the high frequency component $HHv''n$ to the vertical high pass filter 506 via the up sampler 502, transfers the high frequency component $Hh''n$ to the vertical low pass filter 507 via the up sampler 503, transfers the high frequency component $Hv''n$ to the vertical high pass filter 508 via the up sampler 504, and transfers the low frequency component $Ln$ to the vertical low pass filter 509 via the up sampler 505, whereupon the respective frequency components are subjected to vertical direction filtering processing.

Further, the frequency components from the vertical high pass filter 506 and the vertical low pass filter 507 are transferred to the horizontal high pass filter 512 via the up sampler 510, and the frequency components from the vertical high pass filter 508 and the vertical low pass filter 509 are transferred to the horizontal low pass filter 513 via the up sampler 511, whereupon the respective frequency components are subjected to horizontal direction filtering processing. The frequency components from the horizontal high pass filter 512 and the horizontal low pass filter 513 are then transferred to the buffer 514 and synthesized into one, whereby a noise reduction-processed low frequency component $L''n-1$ is generated.

Here, the up samplers 502 to 505 up-sample an input frequency component at an up-sampling ratio of 2 in the vertical direction, whereas the up samplers 510, 511 up-sample an input frequency component at an up-sampling ratio of 2 in the horizontal direction.

The data transfer control unit 515 reads the low frequency component $L''n-1$ from the buffer 514 and transfers the read low frequency component $L''n-1$ to the switching unit 501.

Further, the data reading unit 500 reads the three corrected high frequency components $HHv''n-1$, $Hh''n-1$, $Hv''n-1$ from the buffer 304 and transfers the read frequency components to the switching unit 501.

Similar filtering processing to that described above is then performed on the frequency components of the n−1 separation stage, whereupon a low frequency component $L''n-2$ is output to the buffer 514. This process is repeated until the predetermined n stages have been synthesized. Finally, a corrected low frequency component $L''0$ is output to the buffer 514. The buffer 514 then transfers the low frequency component $L''0$ to the output unit 109.

[Software Processing]

The embodiment described above is constituted such that the image processing is performed through hardware processing, but this invention is not limited to this constitution, and the image processing may be performed through software processing.

For example, the original image signal from the imaging device 102 may be recorded on a computer-readable recording medium such as a memory card as unprocessed raw data, and additional information such as imaging conditions (imaging conditions such as the ISO sensitivity and so on, for example) may be recorded on the recording medium as header information. An image processing program provided as separate software is then executed on a computer such that the information on the recording medium is read to the computer and subjected to processing. Information transmission from the imaging unit to the computer is not limited to the recording medium, and may be performed via a communication line or the like.

The image processing program may be stored on a computer-readable storage medium such as a magnetic disk, a magneto-optical disk, a CD-ROM, a DVD-ROM, or semiconductor memory, or distributed via a communication line. The image processing program is then read to the RAM of the computer and executed by the CPU of the computer, whereby the image processing described above is realized.

Figure 6:
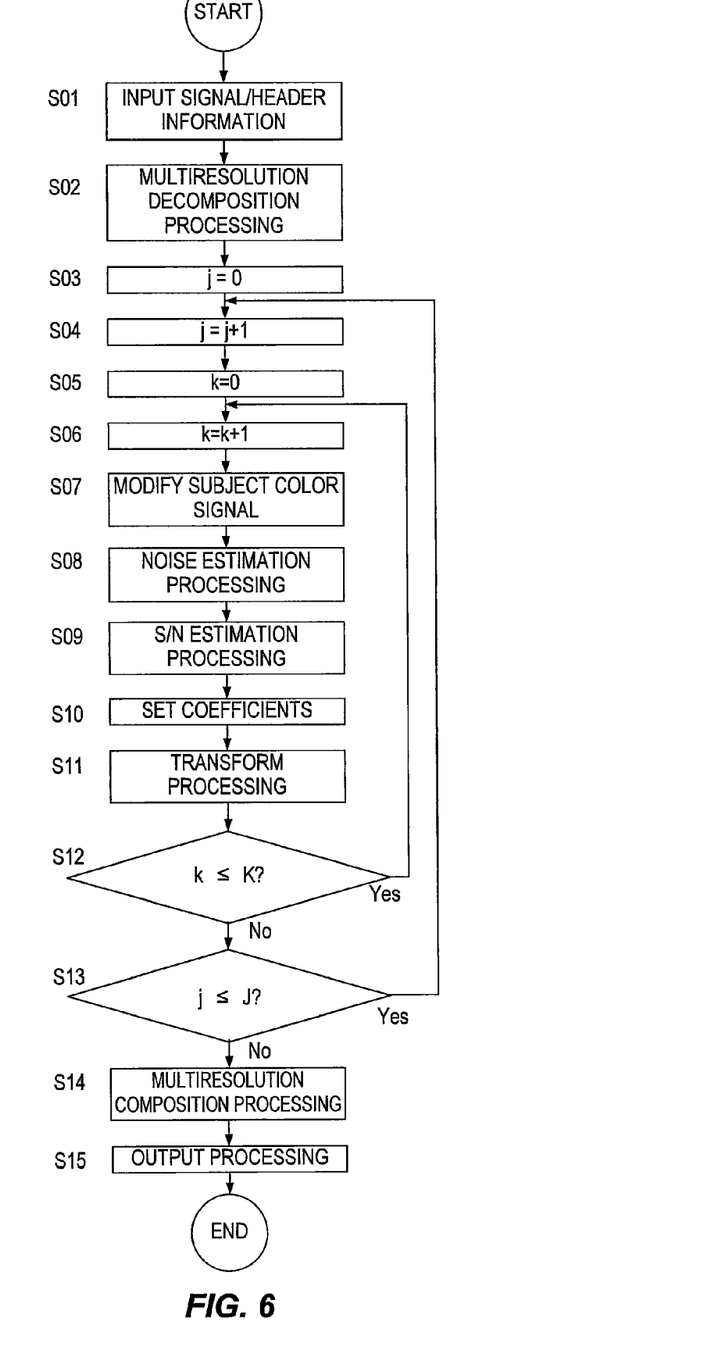
FIG. 6 is a flowchart showing a main routine in a case where similar image processing is realized through software processing.

FIG. 6 is a flowchart showing a main routine of an image processing program when the image processing described above is performed through software processing. This routine will be described below. It should be noted that the multiresolution decomposition processing, S/N ratio estimation, noise reduction processing, and so on performed in the respective steps are identical to the hardware processing described above, and therefore detailed description thereof has been omitted.

When this processing is started, first, an image signal is read together with header information such as the temperature and exposure conditions of the imaging device 102 and the image processing conditions (step S01).

Next, multiresolution decomposition is performed by setting the number of separation stages of each color signal constituting the original image signal at n, whereby the respective subband signals are obtained (step S02).

Next, a variable j indicating a noise reduction repetition number is initialized to 0 (step S03).

Next, the variable j is incremented by 1 (step S04).

Next, a variable k indicating the noise reduction subject color signal is initialized to 0 (step S05).

Next, the variable k is incremented by 1 (step S06).

Next, a subband signal relating to the noise reduction subject color signal is selected on the basis of the value of k. For example, when processing is performed on R, G, B signals, the R signal is selected when k=1, the G signal is selected when k=2, and the B signal is selected when k=3 (step S07).

Next, a noise amount relating to the subband signal of the processing subject color signal is estimated on the basis of the noise model (step S08).

Next, the S/N ratio is estimated on the basis of the noise amount estimated in the step S08 using Equation (3) (step S09).

Next, the coefficients $C_1$, $C_2$ are set on the basis of the S/N ratio estimated in the step S09 using Equation (4) (step S10).

Next, transform processing is performed in accordance with the transform function defined by Equation (5) from the subband signal of the processing subject color signal and the subband signals of the other color signals on the basis of $C_1$ and $C_2$ (step S11).

Next, a determination is made as to whether or not the variable k has reached a predetermined number K, and if not, the routine returns to the step S04. If so, it is assumed that processing on all of the color signals is complete, and the routine advances to a step S13 (step S12).

Next, a determination is made as to whether or not the variable j has reached a predetermined number J, and if not, the routine returns to the step S06. If so, it is assumed that the noise reduction processing has been executed on each of the color signals J times, and the routine advances to a step S14 (step S13).

Next, multiresolution composition is performed using the respective noise reduction-processed subband signals, whereby a noise-reduced image signal is generated (step S14).

Finally, well-known compression processing and the like are performed, whereupon the processed image signal is output (step S15). The series of processes is then terminated.

Thus, the image processing described above can be realized through software processing.

An embodiment of this invention was described above, but the above embodiment merely illustrates a single application of the invention, and the scope of application of this invention is not limited to the specific constitutions of the above embodiment.

This application claims priority based on Japanese Patent Application No. 2008-53378, filed with the Japan Patent Office on Mar. 4, 2008, the entire content of which is incorporated into this specification by reference.

What is claimed is:

1. An image processing apparatus that corrects an image signal including a plurality of color signals, comprising:
    a separation unit that separates the image signal into two or more subband signals including a first subband signal and a second subband signal;
    a selection unit that selects a correction processing subject color signal from the plurality of color signals;
    a noise estimation unit that estimates a noise amount relative to either one of the image signal and the first subband signal;
    an S/N estimation unit that estimates a signal to noise ratio in relation to the first subband signal of the correction processing subject color signal selected by the selection unit, wherein the S/N estimation unit estimates the signal to noise ratio based on the noise amount;
    a coefficient setting unit that sets a coefficient based on the estimated signal to noise ratio; and
    a correction unit that performs correction processing on the first subband signal of the selected correction processing subject color signal by adding the first subband signal of the selected correction processing subject color signal to the second subband signal of another color signal not subject to the correction processing based on the coefficient.

2. The image processing apparatus as defined in claim 1, wherein the correction unit performs the correction processing on the first subband signal of the selected correction processing subject color signal using the following equation:

$$M^{(j+1)} = C_1 \times M^{(0)} + \Sigma(C_2 \times S^{(j)})$$

where, $M^{(j+1)}$: the first subband signal of the correction processing subject color signal after the correction processing has been performed j+1 times, $M^{(0)}$: the first subband signal of the correction processing subject color signal prior to the correction processing, $S^{(j)}$: the second subband signal of the other color signal not subject to the correction processing after the correction processing has been performed j times, and $C_1$, $C_2$: the coefficient set by the coefficient setting unit.

3. The image processing apparatus as defined in claim 2, wherein the coefficient setting unit sets the coefficient based on the signal to noise ratio using the following equations:

$$C_1 = \lambda/(1+2\alpha+2\beta+\lambda)$$

$$C_2 = (\alpha-\beta)/(1+2\alpha+2\beta+\lambda)$$

where, $0_H^{i(j+1)}$: the first subband signal of the correction processing subject color signal after the correction processing has been performed j+1 times, $0_H^{i(0)}$: the first subband signal of the correction processing subject color signal prior to the correction processing, $M_H^{i(j)}$: the second subband signal of the other color signal not subject to the correction processing after the correction processing has been performed j times, $C_1$: a coefficient relating to the first subband signal of the correction processing subject color signal, $C_2$: a coefficient relating to the second subband signal of the other color signal not subject to the correction processing, $\lambda$: the signal to noise ratio, and $\alpha$, $\beta$: predetermined constants.

4. The image processing apparatus as defined in claim 1, further comprising a control unit that performs control to ensure that iterative processing is performed, whereby the correction processing subject color signal is modified every time the correction processing is performed and the separation unit, the S/N estimation unit, the coefficient setting unit, and the correction unit are applied in sequence until the correction processing has been performed on the subband signals of all of the color signals a predetermined number of times.

5. The image processing apparatus as defined in claim 1, wherein the noise estimation unit estimates the noise amount based on a lowest frequency component of the first subband signal.

6. The image processing apparatus as defined in claim 1, wherein the separation unit uses wavelet transform.

7. The image processing apparatus as defined in claim 1, further comprising a synthesizing unit that synthesizes the plurality of subband signals following the noise reduction.

8. A non-transitory computer-readable storage medium storing an image processing program for causing a computer to execute image processing to correct an image signal including a plurality of color signals, wherein the program comprises:
- a separation step for separating the image signal into two or more subband signals including a first subband signal and a second subband signal;
- a selection step for selecting a correction processing subject color signal from the plurality of color signals;
- a noise estimation step for estimating a noise amount relative to either one of the image signal and the first subband signal;
- an S/N estimation step for estimating a signal to noise ratio in relation to the first subband signal of the selected correction processing subject color signal, wherein the signal to noise ratio is estimated based on the estimated noise amount;
- a coefficient setting step for setting a coefficient based on the estimated signal to noise ratio; and
- a correction step for performing correction processing on the first subband signal of the selected correction processing subject color signal by adding the first subband signal of the selected correction processing subject color signal to the second subband signal of another color signal not subject to the correction processing based on the set coefficient.

9. The non-transitory computer-readable storage medium as defined in claim 8, wherein, in the correction step, the correction processing is performed on the first subband signal of the selected correction processing subject color signal using the following equation:

$$M^{(j+1)} = C_1 \times M^{(0)} + \Sigma(C_2 \times S^{(j)})$$

where,
- $M^{(j+1)}$: the first subband signal of the correction processing subject color signal after the correction processing has been performed j+1 times,
- $M^{(0)}$: the first subband signal of the correction processing subject color signal prior to the correction processing,
- $S^{(j)}$: the second subband signal of the other color signal not subject to the correction processing after the correction processing has been performed j times, and
- $C_1$, $C_2$: the coefficient set in the coefficient setting step.

10. The non-transitory computer-readable storage medium as defined in claim 9, wherein, in the coefficient setting step, the coefficient is set based on the signal to noise ratio using the following equations:

$$C_1 = \lambda_G / (1 + 2\alpha + 2\beta + \lambda_G)$$

$$C_2 = (\alpha - \beta) / (1 + 2\alpha + 2\beta + \lambda_G)$$

where,
- $0_H^{i(j+1)}$: the first subband signal of the correction processing subject color signal after the correction processing has been performed j+1 times,
- $0_H^{i(0)}$: the first subband signal of the correction processing subject color signal prior to the correction processing,
- $M_H^{i(j)}$: the second subband signal of the other color signal not subject to the correction processing after the correction processing has been performed j times,
- $C_1$: a coefficient relating to the first subband signal of the correction processing subject color signal,
- $C_2$: a coefficient relating to the second subband signal of the other color signal not subject to the correction processing,
- $\lambda$: the signal to noise ratio, and
- $\alpha$, $\beta$: predetermined constants.

11. The non-transitory computer-readable storage medium as defined in claim 8, further comprising a control step for performing control to ensure that iterative processing is performed, whereby the correction processing subject color signal is modified every time the correction processing is performed and the separation step, the S/N estimation step, the coefficient setting step, and the correction step are applied in sequence until the correction processing has been performed on the subband signals of all of the color signals a predetermined number of times.

12. An image processing apparatus that corrects an image signal including a plurality of color signals, comprising:
- separation means for separating the image signal into two or more subband signals including a first subband signal and a second subband signal;
- selection means for selecting a correction processing subject color signal from the plurality of color signals;
- noise estimation means for estimating a noise amount relative to either one of the image signal and the first subband signal;
- S/N estimation means for estimating a signal to noise ratio in relation to the first subband signal of the correction processing subject color signal selected by the selection means, wherein the S/N estimation means estimates the signal to noise ratio based on the estimated noise amount;
- coefficient setting means for setting a coefficient based on the estimated signal to noise ratio; and
- correction means for performing correction processing on the first subband signal of the selected correction processing subject color signal by adding the first subband signal of the selected correction processing subject color signal to the second subband signal of another color signal not subject to the correction processing based on the set coefficient.

13. An image processing method for correcting an image signal including a plurality of color signals, comprising:
- separating the image signal into two or more subband signals including a first subband signal and a second subband signal;
- selecting a correction processing subject color signal from the plurality of color signals;
- estimating a noise amount relative to either one of the image signal and the first subband signal;
- estimating a signal to noise ratio in relation to the first subband signal of the selected correction processing subject color signal, wherein the signal to noise ratio is estimated based on the estimated noise amount;
- setting a coefficient based on the estimated signal to noise ratio; and
- performing correction processing on the first subband signal of the selected correction processing subject color signal by adding the first subband signal of the selected correction processing subject color signal to the second subband signal of another color signal not subject to the correction processing based on the set coefficient.

* * * * *